United States Patent
Morishita

(10) Patent No.: US 9,593,229 B2
(45) Date of Patent: *Mar. 14, 2017

(54) POLYLACTIC ACID RESIN COMPOSITION AND RESIN MOLDED ARTICLE THEREOF

(71) Applicant: Ken Morishita, Kyoto (JP)

(72) Inventor: Ken Morishita, Kyoto (JP)

(73) Assignee: DAI-ICHI KOGYO SEIYAKU CO., LTD., Kyoto-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/103,553

(22) Filed: Dec. 11, 2013

(65) Prior Publication Data

US 2014/0171559 A1 Jun. 19, 2014

Related U.S. Application Data

(60) Provisional application No. 61/738,133, filed on Dec. 17, 2012.

(30) Foreign Application Priority Data

Dec. 14, 2012 (JP) ................................ 2012-273484

(51) Int. Cl.

| C08L 67/04 | (2006.01) |
|---|---|
| C08K 5/092 | (2006.01) |
| C08K 5/28 | (2006.01) |
| C08K 5/3417 | (2006.01) |
| C08K 5/3432 | (2006.01) |
| C08K 5/41 | (2006.01) |
| C08K 5/00 | (2006.01) |
| C08K 5/103 | (2006.01) |
| C08K 5/20 | (2006.01) |
| C08K 5/53 | (2006.01) |
| C08K 5/25 | (2006.01) |
| C08K 5/34 | (2006.01) |
| C08K 5/42 | (2006.01) |

(52) U.S. Cl.
CPC ............ *C08K 5/092* (2013.01); *C08K 5/0083* (2013.01); *C08K 5/103* (2013.01); *C08K 5/28* (2013.01); *C08K 5/3417* (2013.01); *C08K 5/3432* (2013.01); *C08K 5/41* (2013.01); *C08L 67/04* (2013.01); *C08K 5/0091* (2013.01); *C08K 5/20* (2013.01); *C08K 5/25* (2013.01); *C08K 5/34* (2013.01); *C08K 5/42* (2013.01); *C08K 5/53* (2013.01); *C08K 2201/014* (2013.01)

(58) Field of Classification Search
CPC .. C08L 67/04; C08K 5/20; C08K 5/25; C08K 5/28; C08K 5/34; C08K 5/41; C08K 5/42; C08K 5/53; C08K 5/0083; C08K 5/0091; C08K 5/092; C08K 5/103; C08K 5/3417; C08K 5/3432; C08K 2201/014
See application file for complete search history.

(56) References Cited

U.S. PATENT DOCUMENTS

| 5,641,502 A * | 6/1997 | Skalla ................. A61L 24/0036 424/426 |
|---|---|---|
| 5,955,402 A * | 9/1999 | Hirata ..................... C08L 67/02 508/100 |
| 6,573,340 B1 * | 6/2003 | Khemani ................ B32B 27/06 428/480 |
| 8,900,698 B2 * | 12/2014 | Tabata ....................... C08J 5/18 428/339 |
| 2002/0107147 A1 | 8/2002 | Hayashi et al. |
| 2007/0112107 A1 * | 5/2007 | Yamashita ........... C08K 5/0066 524/115 |
| 2008/0153940 A1 * | 6/2008 | Scheer .................... C08L 67/02 523/124 |
| 2008/0262150 A1 | 10/2008 | Takenaka et al. |
| 2010/0130651 A1 * | 5/2010 | Fukawa ................ C08F 283/02 524/88 |
| 2010/0201037 A1 | 8/2010 | Takenaka et al. |
| 2011/0178211 A1 * | 7/2011 | Kawahara ............. C08G 63/91 524/88 |

(Continued)

FOREIGN PATENT DOCUMENTS

| CN | 101768345 A | 7/2010 |
|---|---|---|
| CN | 101801636 A | 8/2010 |

(Continued)

OTHER PUBLICATIONS

JP 2008031375 A, Feb. 2008, Derwent Ab.*
JP 2006083315 A, Mar. 2006, Derwent Ab.*
WO 2008010318 A1, Jan. 2008, Machine translation.*
JP 2009024081 A, Feb. 2009, Machine translation.*
JP2004323758A1, DERWENT Ab., May 2010.*
JP 2007246624 A, Machine translation, Sep. 2007.*
Extended European Search Report dated Dec. 4, 2013, issued in counterpart European Patent Application No. 12195694.0 (4 pages).
Extended European Search Report dated Apr. 23, 2013, issued in counterpart European Patent Application No. 12195691.6 (5 pages).
Extended European Search Report dated Mar. 15, 2013, issued in counterpart European Patent Application No. 12195688.2 (4 pages).

(Continued)

*Primary Examiner* — Satya Sastri
(74) *Attorney, Agent, or Firm* — Westerman, Hattori, Daniels & Adrian, LLP

(57) ABSTRACT

A polylactic acid resin composition excellent in impact resistance, migration resistance, and heat resistance, and excellent in productivity at the time of the mold forming thereof, and a resin molded article thereof. The polylactic acid resin composition includes a polylactic acid; a reaction product of at least one selected from the group consisting of sorbitol, mannitol, and dehydration condensates thereof, an alkylene oxide mainly formed of ethylene oxide, and a fatty acid having 12 to 24 carbon atoms; and a crystal nucleating agent comprising at least one compound selected from: an organic phosphonic acid salt compound, an amide compound having a ring structure, an organic hydrazide compound, an organic sulfonic acid salt compound, a phthalocyanine compound, and a melamine compound.

16 Claims, No Drawings

(56) References Cited

U.S. PATENT DOCUMENTS

| | | | |
|---|---|---|---|
| 2012/0029112 A1* | 2/2012 | Stefanisin | C08L 1/02 523/124 |
| 2013/0150505 A1* | 6/2013 | Onishi | C08K 5/103 524/111 |
| 2013/0150510 A1* | 6/2013 | Onishi | C08K 5/20 524/230 |
| 2014/0296399 A1 | 10/2014 | Tsuboi et al. | |

FOREIGN PATENT DOCUMENTS

| | | | | |
|---|---|---|---|---|
| CN | 102753621 A | | 10/2012 | |
| JP | 2006083315 A | * | 3/2006 | |
| JP | 2007130895 A | | 5/2007 | |
| JP | 2007246624 A | * | 9/2007 | |
| JP | WO 2008010318 A2 | * | 1/2008 | C08K 3/34 |
| JP | 2008031375 A | * | 2/2008 | |
| JP | 2008-150492 A | | 7/2008 | |
| JP | 2009024081 A | * | 2/2009 | |
| JP | 2004323758 A1 | * | 5/2010 | C08J 3/20 |
| JP | 2011208042 A | | 10/2011 | |
| JP | WO 2012014670 A1 | * | 2/2012 | C08J 5/18 |
| WO | WO 2008010318 A1 | * | 1/2008 | |
| WO | WO2008010318 A1 | | 1/2008 | |
| WO | 2008/075775 A1 | | 6/2008 | |

OTHER PUBLICATIONS

Notification of Transmittal of Translation of the International Preliminary Report on Patentability (Form PCT/IB/338) of International Application No. PCT/JP2013/080484 mailed Jun. 25, 2015 with Forms PCT/IB/373 and PCT/ISA/237 (7 pages).
Rheodol; TW-IS399C MSDS Kao Corporation; Jan. 7, 2009.

\* cited by examiner

POLYLACTIC ACID RESIN COMPOSITION AND RESIN MOLDED ARTICLE THEREOF

CROSS-REFERENCE TO RELATED APPLICATIONS

This application claims the benefit of U.S. Provisional Application No. 61/738,133, filed on Dec. 17, 2012, and Japanese Application No. JP2012-273484 filed on Dec. 14, 2012, the complete disclosures of which, in their entireties, are hereby incorporated by reference.

BACKGROUND

Technical Field

The embodiments herein relate to a polylactic acid resin composition and a resin molded article thereof.

Description of the Related Art

While depletion of petroleum resources, a $CO_2$ reduction, and the like have been perceived as problems, a polylactic acid using lactic acid obtained by fermenting a grain resource such as corn as a raw material has been attracting attention. Polylactic acid is a resin derived from a plant as described above and has the following characteristics: Polylactic acid has high rigidity, and is excellent in transparency. However, its applications have been generally limited as compared to an ordinary resin because of, for example, the following reasons: Polylactic acid generally has low heat resistance and low impact resistance, and hence typically cannot be used under a high-temperature condition.

Available as a method of improving the heat resistance of the polylactic acid is, for example, a method involving increasing its crystallinity through a heat treatment (annealing treatment). However, the method is generally not practical because of an extremely long heat treatment time.

In view of the foregoing, blending of various plasticizers and crystal nucleating agents into a resin composition using the polylactic acid as a polymer has been investigated as a method of solving those problems in recent years.

For example, the following has been proposed as an example of the blending (International Publication No. WO2008/010318A). A fatty acid ester formed of a dehydration condensate of a sugar alcohol and a fatty acid is used as the plasticizer, and a layered silicate is used as the crystal nucleating agent.

In addition to the foregoing, for example, the following has been proposed (Japanese Patent Application Laid-open No, 2007-130895 and Japanese Patent Application Laid-open No. 2011-208042). A glycerin fatty acid ester, an ester of succinic acid and triethylene glycol monomethyl ether, or the like is used as the plasticizer, and a fatty acid amide is used as the crystal nucleating agent.

However, generally applications where the resin composition disclosed in International Publication No. WO2008/010318A can be used are extremely limited owing to its low heat resistance. Moreover, the resin composition involves a problem in that productivity at the time of its mold forming is poor because a molded article thereof is liable to deform upon its removal from the mold unless a molding time during the mold forming is set to be long.

On the other hand, the impact resistance of the resin composition disclosed in each of Japanese Patent Application Laid-open No, 2007-130895 and Japanese Patent Application Laid-open No. 2011-208042 has been somewhat improved. However, a molded article excellent in impact resistance and migration resistance typically cannot be obtained from the resin composition because the resin composition is liable to be migrated in water or an alcohol. Further, the resin composition still has room for improvement because its productivity at the time of the mold forming thereof is typically not sufficient.

Accordingly, it would be desirable to provide a polylactic acid resin composition excellent in impact resistance, migration resistance, and heat resistance, and excellent in productivity at the time of the mold forming thereof, and a resin molded article thereof.

SUMMARY

In view of the foregoing, an embodiment herein provides a polylactic acid resin composition, including the following: (A) a polylactic acid; (B) a reaction product of at least one selected from the group consisting of sorbitol, mannitol, and dehydration condensates thereof, an alkylene oxide mainly formed of ethylene oxide, and a fatty acid having 12 to 24 carbon atoms; and (C) a crystal nucleating agent comprising at least one compound selected from the group consisting of an organic phosphonic acid salt compound, an amide compound having a ring structure, an organic hydrazide compound, an organic sulfonic acid salt compound, a phthalocyanine compound, and a melamine compound.

Another embodiment provides a resin molded article formed of the polylactic acid resin composition described above.

The inventors of the embodiments herein have made extensive studies to obtain a polylactic acid resin composition excellent in impact resistance, migration resistance, and heat resistance, and excellent in productivity at the time of the mold forming thereof. As a result, the inventors of the embodiments herein have found that a polylactic acid resin composition excellent in impact resistance, migration resistance, and heat resistance, and excellent in productivity at the time of the mold forming thereof, and a molded article thereof can be achieved by the following procedure. A specific reaction product, i.e., the reaction product (component B) of at least one selected from the group consisting of sorbitol, mannitol, and the dehydration condensates thereof, the alkylene oxide mainly formed of ethylene oxide, and the fatty acid having 12 to 24 carbon atoms is blended as a plasticizer into a resin composition using a polylactic acid as a polymer, and a specific crystal nucleating agent (component C) such as the organic phosphonic acid salt compound, the amide compound having a ring structure, the organic hydrazide compound, the organic sulfonic acid salt compound, the phthalocyanine compound, or the melamine compound is further blended into the composition. Thus, the embodiments herein have been completed.

As described above, the polylactic acid resin composition of the embodiments herein contains the polylactic acid (component A), the reaction product (component B) of at least one selected from the group consisting of sorbitol, mannitol, and the dehydration condensates thereof, the alkylene oxide mainly formed of ethylene oxide, and the fatty acid having 12 to 24 carbon atoms, and the specific crystal nucleating agent (component C) such as the organic phosphonic acid salt compound. Therefore, the composition is excellent in impact resistance, migration resistance, and heat resistance, and can exert an excellent effect on its productivity at the time of the mold forming (a resin molded article thereof can be efficiently obtained within a short time period without the occurrence of the deformation at the time of its removal from the mold). In addition, the composition exerts the following effect. The composition eliminates the need for countermeasures against high temperatures at the time of, for example, its transportation because the composition is excellent in heat resistance and the like.

In particular, when the reaction product as the component B contains an oxyethylene group in a specific range, the polylactic acid resin composition of the embodiments herein and the resin molded article thereof each become additionally excellent in productivity at the time of molding, and the like.

In addition, when the content of the reaction product as the component B falls within a specific range, the polylactic acid resin composition of the embodiments herein and the resin molded article thereof each become additionally excellent in impact resistance and the like.

In addition, when the content of the crystal nucleating agent as the component C falls within a specific range, the polylactic acid resin composition of the embodiments herein and the resin molded article thereof each become additionally excellent in productivity at the time of molding, and the like.

These and other aspects of the embodiments herein will be better appreciated and understood when considered in conjunction with the following description. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION

According to the embodiment herein, the polylactic acid resin composition contains the polylactic acid (component A), the reaction product (component B) of at least one selected from the group consisting of sorbitol, mannitol, and the dehydration condensates thereof, the alkylene oxide mainly formed of ethylene oxide, and the fatty acid having 12 to 24 carbon atoms, and the specific crystal nucleating agent (component C). In the polylactic acid resin composition of the embodiments herein, the reaction product as the component (B) typically has an action as a plasticizer and the component (C) has an action as a crystal nucleating agent. It should be noted that the polylactic acid resin composition of the embodiments herein can contain, for example, a resin except the polylactic acid, an inorganic filler, a hydrolysis inhibitor, an impact modifier, or an antioxidant in addition to the above-mentioned components as required.

Polylactic Acid

The polylactic acid (component A) in the polylactic acid resin composition of the embodiments herein refers to both a polylactic acid obtained by subjecting only lactic acid as a raw material monomer to condensation polymerization, and a polylactic acid obtained by subjecting a lactic acid component and a hydroxycarboxylic acid component except lactic acid (hereinafter, sometimes simply referred to as "hydroxycarboxylic acid component") as raw material monomers to condensation polymerization.

Optical isomers, i.e., L-lactic acid (L-form) and D-lactic acid (D-form) exist for lactic acid. Although only one of the optical isomers may, or both the isomers may each, be incorporated as a lactic acid component in the embodiments herein, lactic acid having a high optical purity, the lactic acid using one of the optical isomers as a main component, is preferably used from the viewpoints of: the achievement of compatibility between the flexibility of the polylactic acid resin composition, and its rigidity and heat resistance; and productivity at the time of molding. It should be noted that the term "main component" as used herein refers to a component whose content in the lactic acid component is 80 mol % or more.

The content of the L-form or the D-form in the lactic acid component, i.e., the content of the more abundant one of the isomers in the case where only the lactic acid component is subjected to condensation polymerization is preferably 95.0 mol % or more, more preferably 98 mol % or more from the above-mentioned viewpoints.

The content of the L-form or the D-form in the lactic acid component, i.e., the content of the more abundant one of the isomers in the case where the lactic acid component and the hydroxycarboxylic acid component are subjected to condensation polymerization is preferably 95.0 mol % or more, more preferably 98 mol % or more from the above-mentioned viewpoints.

In addition to a product obtained by subjecting only the D-form as lactic acid to condensation polymerization, a product obtained by subjecting only the L-form as lactic acid to condensation polymerization, and a product obtained by copolymerizing the D-form and the L-form, a product obtained by blending a polylactic acid using the L-form as a main component and a polylactic acid using the D-form as a main component at arbitrary ratios may also be used as the polylactic acid.

On the other hand, examples of the hydroxycarboxylic acid component except lactic acid include hydroxycarboxylic acid compounds such as glycolic acid, hydroxybutyric acid, hydroxyvaleric acid, hydroxypentanoic acid, hydroxycaproic acid, and hydroxyheptanoic acid. One kind of those hydroxycarboxylic acid components is used alone, or two or more kinds thereof are used in combination. Of those, glycolic acid and hydroxycaproic acid are preferred.

In addition, in the embodiments herein, dimers of lactic acid and the hydroxycarboxylic acid compound may be incorporated into each component. For example, a lactide as a cyclic dimer of lactic acid is used as the dimer of lactic acid, and for example, glycolide as a cyclic dimer of glycolic acid is used as the dimer of the hydroxycarboxylic acid compound. It should be noted that the lactides are classified into an L-lactide as a cyclic dimer of L-lactic acid, a D-lactide as a cyclic dimer of D-lactic acid, a meso-lactide obtained by the cyclic dimerization of D-lactic acid and L-lactic acid, and a DL-lactide as a racemic mixture of the D-lactide and the L-lactide. Although each of the lactides can be used in the embodiments herein, the D-lactide and the L-lactide are preferred from the viewpoints of the flexibility and rigidity of the polylactic acid resin composition, and productivity at the time of the molding of the polylactic acid resin. It should be noted that the dimer of lactic acid may be incorporated into the lactic acid component in each of the situations where only the lactic acid component is subjected to condensation polymerization, and the situation where the lactic acid component and the hydroxycarboxylic acid component are subjected to condensation polymerization.

The condensation polymerization reaction of only the lactic acid component, and the condensation polymerization reaction of the lactic acid component and the hydroxycarboxylic acid component are not particularly limited, and can each be performed by employing a known method.

In addition, the weight-average molecular weight of the polylactic acid in the embodiments herein falls within the range of typically 10,000 to 400,000, preferably 50,000 to 400,000. The weight-average molecular weight more preferably falls within the range of 100,000 to 300,000. That is because of the following reasons. When the weight-average molecular weight of the polylactic acid falls short of the range, the mechanical properties of a resin molded article are low. In contrast, when the weight-average molecular weight of the polylactic acid outstrips the range, the polylactic acid becomes poor in flowability at the time of the molding thereof. It should be noted that the weight-average molecular weight of the polylactic acid can be determined in terms of styrene having a known molecular weight as a reference by using a gel permeation chromatograph (GPC), chloroform as a solvent, a high-temperature SEC column (GMHHR-H series) manufactured by TOSOH CORPORATION, for example, as a column with its flow rate and column temperature set to 1.0 mL/min and 40° C., respectively, and a refractive index detector (RI) as a detector.

Plasticizer

The reaction product (component B) of at least one selected from the group consisting of sorbitol, mannitol, and the dehydration condensates thereof, the alkylene oxide mainly formed of ethylene oxide, and the fatty acid having 12 to 24 carbon atoms is used as the plasticizer in the polylactic acid resin composition of the embodiments herein. The term "alkylene oxide mainly formed of ethylene oxide" indicates that ethylene oxide accounts for over half of the alkylene oxide and is intended to encompass an alkylene oxide entirely formed of ethylene oxide. It should be noted that, when an alkylene oxide except ethylene oxide is used in combination with ethylene oxide as the alkylene oxides, for example, propylene oxide, butylene oxide, or isobutylene oxide is used in combination.

A method of producing the reaction product (component B) is, for example, a method involving: causing a polyol such as sorbitol or mannitol and the fatty acid to react with each other under heating to esterify the polyol; and subjecting the ethylene oxide to an addition reaction with the resultant under heating in an autoclave to provide the reaction product (component B). Alternatively, after the dehydration condensate of the polyol and the fatty acid have been caused to react with each other so that the dehydration condensate may be esterified, ethylene oxide may be added to the resultant in the same manner as in the above-mentioned method. Alternatively, after ethylene oxide has been added to the polyol and the polyol dehydration condensate, the fatty acid may be caused to react with the resultant. Also available is, for example, a method involving: synthesizing a fatty acid ester from the fatty acid and a monohydric alcohol having a small number of carbon atoms (methanol or ethanol) in advance; subjecting the ester to an ester exchange reaction with the polyol and the polyol dehydration condensate; and adding ethylene oxide to the resultant in the same manner as in the above-mentioned method to provide the reaction product (component B). In the polylactic acid resin composition of the embodiments herein, one kind of the reaction products (components B) thus obtained is used alone, or two or more kinds thereof are used in combination.

In addition, the content of an oxyethylene group in the reaction product (component B) is preferably 20 to 95 wt %, more preferably 30 to 95 wt % from such a viewpoint that the polylactic acid resin composition of the embodiments herein is excellent in impact resistance.

In addition, the reaction product (component B) may be any one of a saturated ester obtained by esterifying all hydroxyl groups of the polyol and the polyol dehydration condensate with a fatty acid, and a partial ester obtained by esterifying part of the hydroxyl groups.

In addition, the reaction product (component B) has preferably 0.5 to 6, and more preferably 0.8 to 6, ester groups on average in a molecule thereof from the viewpoint of the impact resistance.

The fatty acid having 12 to 24 carbon atoms is used in the synthesis of the reaction product (component B) and a fatty acid having 14 to 24 is preferably used from such a viewpoint that the polylactic acid resin composition of the embodiments herein is excellent in impact resistance, and in migration resistance for water and an alcohol-based solvent. That is because of the following reasons: when the number of carbon atoms in the fatty acid falls short of the range, the desired impact resistance is hardly obtained. Further, the amount of the composition to be migrated in water or the alcohol-based solvent increases. In contrast, when the number of carbon atoms in the fatty acid outstrips the range, the composition has bad compatibility with the polylactic acid (A) as a polymer. It should be noted that a fatty acid corresponding to any one of a saturated fatty acid and an unsaturated fatty acid may be used as the fatty acid, and the fatty acids may be used in combination. Alternatively, the fatty acid may be a mixture of fatty acids transformed from oils and fats. In that case, a mixture whose average number of carbon atoms falls within the range is used.

In addition, specific examples of the reaction product (component B) include a polyoxyethylene sorbitol laurate, a polyoxyethylene sorbitol cocoate, a polyoxyethylene sorbitol myristate, a polyoxyethylene sorbitol palmitate, a polyoxyethylene sorbitol linoleate, a polyoxyethylene sorbitol stearate, a polyoxyethylene sorbitol isostearate, a polyoxyethylene sorbitol-12-hydroxystearate, a polyoxyethylene sorbitol oleate, a polyoxyethylene sorbitol eicosanoate, a polyoxyethylene sorbitol behenate, a polyoxyethylene sorbitol lignocerate, a polyoxyethylene sorbitan laurate, a polyoxyethylene sorbitan cocoate, a polyoxyethylene sorbitan myristate, a polyoxyethylene sorbitan palmitate, a polyoxyethylene sorbitan linoleate, a polyoxyethylene sorbitan stearate, a polyoxyethylene sorbitan isostearate, a polyoxyethylene sorbitan-12-hydroxystearate, a polyoxyethylene sorbitan oleate, a polyoxyethylene sorbitan eicosanoate, a polyoxyethylene sorbitan behenate, a polyoxyethylene sorbitan lignocerate, a polyoxyethylene isosorbide laurate, a polyoxyethylene isosorbide cocoate, a polyoxyethylene isosorbide myristate, a polyoxyethylene isosorbide palmitate, a polyoxyethylene isosorbide linoleate, a polyoxyethylene isosorbide stearate, a polyoxyethylene isosorbide isostearate, a polyoxyethylene isosorbide-12-hydroxystearate, a polyoxyethylene isosorbide oleate, a polyoxyethylene isosorbide eicosanoate, a polyoxyethylene isosorbide behenate, a polyoxyethylene isosorbide lignocerate, a polyoxyethylene mannitol laurate, a polyoxyethylene mannitol cocoate, a polyoxyethylene mannitol myristate, a polyoxyethylene mannitol palmitate, a polyoxyethylene mannitol linoleate, a polyoxyethylene mannitol stearate, a polyoxyethylene mannitol isostearate, a polyoxyethylene mannitol-12-hydroxystearate, a polyoxyethylene mannitol oleate, a polyoxyethylene mannitol eicosanoate, a polyoxyethylene mannitol behenate, a polyoxyethylene mannitol lignocerate, a polyoxyethylene mannitan laurate, a polyoxyethylene mannitan cocoate, a polyoxyethylene mannitan myristate, a polyoxyethylene mannitan palmitate, a polyoxyethylene mannitan linoleate, a polyoxyethylene mannitan stearate, a polyoxyethylene mannitan isostearate, a polyoxyethylene mannitan-12-hydroxystearate, a polyoxyethylene mannitan oleate, a polyoxyethylene mannitan eicosanoate, a polyoxyethylene mannitan behenate, a polyoxyethylene mannitan lignocerate, a polyoxyethylene isomannide laurate, a polyoxyethylene isomannide cocoate, a polyoxyethylene isomannide myristate, a polyoxyethylene isomannide palmitate, a polyoxyethyleneisomannidelinoleate, a polyoxyethylene isomannide stearate, a polyoxyethylene isomannide isostearate, a polyoxyethylene isomannide-12-hydroxystearate, a polyoxyethylene isomannide oleate, a polyoxyethylene isomannide laurate, a polyoxyethylene isomannide eicosanoate, a polyoxyethylene isomannide behenate, and a polyoxyethylene isomannide lignocerate. One kind of those reaction products is used alone, or two or more kinds thereof are used in combination. It should be noted that as one or a plurality of fatty acid ester groups exist in one molecule of each of the reaction products listed above, the term "polyoxyethylene sorbitol laurate," for example, is intended to encompass "polyoxyethylene sorbitol monolaurate, polyoxyethylene sorbitol dilaurate, polyoxyethylene sorbitol trilaurate, polyoxyethylene sorbitol tetralaurate, and the like."

The content of the reaction product (component B) in the polylactic acid resin composition of the embodiments herein falls within the range of preferably 0.5 to 20 parts by weight, more preferably 1 to 15 parts by weight, still more preferably 2 to 15 parts by weight, and most preferably 3 to 10 parts by weight with respect to 100 parts by weight of the polylactic acid (component A) from such a viewpoint that the composition becomes excellent in impact resistance, productivity at the time of the molding thereof, and the like.

Crystal Nucleating Agent

The specific crystal nucleating agent (component C) such as the organic phosphonic acid salt compound, the amide compound having a ring structure, the organic hydrazide compound, the organic sulfonic acid salt compound, the phthalocyanine compound, or the melamine compound is used as the crystal nucleating agent in the polylactic acid resin composition of the embodiments herein from the viewpoints of, for example, the moldability, heat resistance, and impact resistance of a polylactic acid resin molded article. In addition, one kind of those crystal nucleating agents is used alone, or two or more kinds thereof are used in combination.

The organic phosphonic acid salt compound is not particularly limited, but a phenylphosphonic acid metal salt is preferably used from the viewpoint of a crystallization promoting effect. Specific examples thereof include lithium phenylphosphonate, sodium phenylphosphonate, potassium phenylphosphonate, magnesium phenylphosphonate, calcium phenylphosphonate, barium phenylphosphonate, iron phenylphosphonate, cobalt phenylphosphonate, copper phenylphosphonate, manganese phenylphosphonate, and zinc phenylphosphonate. Of those, zinc phenylphosphonate is preferred in terms of a more enhanced crystallization promoting effect.

The amide compound having a ring structure is an amide compound having an aromatic ring and/or an aliphatic ring (thus excluding a fatty acid amide compound), and specific examples thereof include 1,4-cyclohexanedicarboxylic acid dicyclohexylamide, 2,6-naphthalenedicarboxylic acid dicyclohexylamide, 2,6-naphthalenedicarboxylic acid dianilide, 1,4-cyclohexanedicarboxylic acid dianilide, N,N',N"-tricyclohexyl trimesic acid amide, trimesic acid tris(t-butylamide), N,N'-dicyclohexanecarbonyl-1,5-diaminonaphthalene, and N,N'-dibenzoyl-1,4-diaminocyclohexane. Of those, N,N',N"-tricyclohexyl trimesic acid amide is preferred in terms of the crystallization promoting effect.

Specific examples of the organic hydrazide compound include hexamethylenedicarboxylic acid dibenzoylhydrazide, octamethylenedicarboxylic acid dibenzoylhydrazide, and decamethylenedicarboxylic acid dibenzoylhydrazide. Of those, octamethylenedicarboxylic acid dibenzoylhydrazide and decamethylenedicarboxylic acid dibenzoylhydrazide are preferred in terms of the crystallization promoting effect.

Examples of the organic sulfonic acid salt compound include sulfoisophthalic acid salts. Of those, metal salts of dimethyl 5-sulfoisophthalate are preferred, a barium salt, calcium salt, strontium salt, potassium salt, and rubidium salt thereof are more preferred, barium dimethyl 5-sulfoisophthalate, and potassium dimethyl 5-sulfoisophthalate are still more preferred in terms of the crystallization promoting effect.

The phthalocyanine compound is preferably a metal phthalocyanine in terms of the crystallization promoting effect. In particular, copper phthalocyanine is preferred because its crystallization promoting effect is more excellent.

Examples of the melamine compound include melamine polyphosphate and melamine cyanurate. Of those, melamine cyanurate is preferred in terms of the crystallization promoting effect.

The content of the specific crystal nucleating agent (component C) in the polylactic acid resin composition of the embodiments herein falls within the range of preferably 0.1 to 5 parts by weight with respect to 100 parts by weight of the polylactic acid (component A) from such a viewpoint that the composition becomes excellent in productivity at the time of the molding, and the like.

Other Resins

In addition to the components (A) to (C), any other resin may be appropriately incorporated into the polylactic acid resin composition of the embodiments herein as long as the effect of the embodiments herein is not impaired (i.e., in the range of less than 20 wt %, preferably 1 to 15 wt %, more preferably 1 to 10 wt % of the whole polylactic acid resin composition). Examples of the other resins include: thermoplastic resins such as a thermoplastic acrylic resin such as a polymethyl methacrylate (PMMA), a polypropylene, a polystyrene, an ABS resin, an AS resin, a polyphenylene sulfide, a polyetheretherketone, a polyester, a polyacetal, a polysulfone, a polyphenylene oxide, and a polyetherimide; and thermosetting resins such as a phenol resin, a melamine resin, an unsaturated polyester resin, a silicone resin, and an epoxy resin. One kind of those resins is used alone, or two or more kinds thereof are used in combination.

Inorganic Filler

Further, an inorganic filler may be incorporated into the polylactic acid resin composition of the embodiments herein as required. Specific examples of the inorganic filler include talc, clay, mica, zeolite, bentonite, montmorillonite, a glass fiber, and a carbon fiber. One kind of those inorganic fillers is used alone, or two or more kinds thereof are used in combination.

In addition, the content of the inorganic filler in the polylactic acid resin composition of the embodiments herein falls within the range of preferably 0.01 to 2 parts by weight, more preferably 0.01 to 1 part by weight with respect to 100 parts by weight of the polylactic acid (component A) from such a viewpoint that the composition becomes excellent in impact resistance, bending strength, and the like.

Hydrolysis Inhibitor

In addition, a hydrolysis inhibitor may be incorporated into the polylactic acid resin composition of the embodiments herein as required. Examples of the hydrolysis inhibitor include carbodiimide compounds such as a polycarbodiimide compound and a monocarbodiimide compound. Of those, a polycarbodiimide compound is preferred from the viewpoints of the moldability, heat resistance, and impact resistance of the polylactic acid resin molded article, and a monocarbodiimide compound is more preferred from the viewpoints of the heat resistance, moldability, and flowability of the polylactic acid resin molded article.

Examples of the polycarbodiimide compound include a poly(4,4'-diphenylmethanecarbodiimide), a poly(4,4'-dicyclohexylmethanecarbodiimide), a poly(1,3,5-triisopropylbenzene)polycarbodiimide, and a poly(1,3,5-triisopropylbenzene and 1,5-diisopropylbenzene)polycarbodiimide. The monocarbodiimide compound is, for example, N,N'-di-2,6-diisopropylphenylcarbodiimide.

In addition, the content of the hydrolysis inhibitor in the polylactic acid resin composition of the embodiments herein falls within the range of preferably 0.05 to 2 parts by weight, and more preferably 0.1 to 1 part by weight with respect to 100 parts by weight of the polylactic acid (component A) from the viewpoint of the moldability of the polylactic acid resin molded article.

Impact Modifier

In addition, an impact modifier may be incorporated into the polylactic acid resin composition of the embodiments herein as required from the viewpoints of improvements in its physical properties such as flexibility. A (meth)acrylic acid polymer, an ethylene-(meth)acrylic acid copolymer, an ethylene-alkyl (meth)acrylate) acrylate copolymer, an epoxy-modified silicone acrylic rubber, a copolymer of a diene and a vinyl monomer, and a hydrogenated product thereof, organic fibers such as an aromatic polyamide fiber, a diene rubber, a compatibilizer, and the like can each be used as the impact modifier. It should be noted that the term "(meth)acrylic acid" refers to acrylic acid and/or methacrylic acid.

In addition, the content of the impact modifier in the polylactic acid resin composition of the embodiments herein falls within the range of preferably 1 to 20 parts by weight, and more preferably 3 to 10 parts by weight with respect to 100 parts by weight of the polylactic acid (component A) from the viewpoints of the impact resistance and moldability of the resin composition.

The polylactic acid resin composition of the embodiments herein can contain a flame retardant, an antioxidant, a lubricant, an antistatic agent, an anti-fogging agent, a light stabilizer, a UV absorber, a pigment, a colorant, an antifungal agent, an antibacterial agent, a foaming agent, or the like as any other component except the foregoing to such an extent that the achievement of the object of the embodiments herein is not impaired.

Production of Polylactic Acid Resin Composition and Resin Molded Article Thereof The polylactic acid resin composition of the embodiments herein can be prepared by: blending the polylactic acid (component A), the specific reaction product (component B) as a plasticizer, and the specific crystal nucleating agent (component C), and as required, any other material at predetermined ratios; and melting and mixing the materials at 160 to 240° C. It should be noted that the melting and mixing may be performed after the respective materials have been blended. Alternatively, the composition may be prepared by the following procedure. After the polylactic acid (component A) has been previously melted with an extruder, a Banbury mixer, a kneader, a heating roll, or the like, the other materials are blended into the molten product and then the mixture is shaped into a uniform pellet shape.

Then, a resin molded article can be obtained by using the resin composition melted and mixed as described above as a material through cast molding, injection molding, blow molding, extrusion molding, or the like. In addition, the composition can be molded into various molded articles by molding methods such as vacuum molding, pressure molding, and vacuum pressure molding after the composition has been processed into a sheet.

When the composition is formed with a mold for obtaining the resin molded article, the temperature of the mold at the time of the molding falls within the range of preferably 40 to 140° C., and more preferably 70 to 120° C. from the viewpoint of productivity. In addition, the time period for which the resin molded article is held in the mold in vacuum molding, pressure molding, or vacuum pressure molding is preferably 1 to 15 seconds, and more preferably 1 to 10 seconds from the viewpoints of productivity and the like.

The polylactic acid resin composition of the embodiments herein and the resin molded article thereof thus obtained each have high migration resistance for a food simulant. For example, a migration amount in the following case is less than 50 μg/cm$^2$, and is as low as less than 6 μg/cm$^2$ for one having a higher migration resistance. A sample sheet of the polylactic acid resin composition or the resin molded article is immersed in a 10% ethanol solution (food simulant) and heated at 60 to 70° C. for about 2 hours. Then, the solution after the sheet has been taken out is evaporated to dryness, and the weight of the residue is measured to determine the migration amount per unit area (μg/cm$^2$) of the sheet. The polylactic acid resin composition of the embodiments herein and the resin molded article thereof show low migration amounts as described above, and hence can be safely used as food packaging containers. In addition, reductions in physical properties of the polylactic acid resin composition of the embodiments herein and the resin molded article thereof are suppressed as compared to conventional products.

In addition, each of the polylactic acid resin compositions of the embodiments herein and the resin molded article thereof is excellent in impact resistance, heat resistance, and the like, and has high biodegradability. Accordingly, the polylactic acid resin composition of the embodiments herein and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the embodiments herein can be suitably utilized in wider fields than a conventional polylactic acid resin composition is because its impact resistance, heat resistance, and the like have been improved as compared to those of the conventional polylactic acid resin composition.

EXAMPLES

Next, examples are described together with comparative examples. However, the embodiments herein are not limited to these examples.

First, the following materials were prepared prior to the examples and the comparative examples.

Polylactic Acid A-1

Polylactic acid (trade name: 4032D, manufactured by Natureworks LLC.)

Polylactic Acid A-2

Polylactic acid (trade name: REVODE190, manufactured by Zhejiang Hisun Biomaterials Co., Ltd.)

Polylactic Acid A-3

Poly-D-lactic acid obtained by Synthesis Example 1 below.

Synthesis Example 1

Under a nitrogen atmosphere, 1,000 g of a D-lactide (manufactured by Purac) were melted by being heated to 120° C., and then 0.3 g of tin octylate and 0.01 g of stearyl alcohol were added thereto. After that, the temperature was increased to 180° C. and polymerization was performed for 1.5 hours. Further, the pressure was reduced to 0.1 Torr and polymerization was performed for 0.5 hour. Thus, the poly-D-lactic acid of interest was obtained. The resultant poly-D-lactic acid had a weight-average molecular weight of 171,000.

Plasticizer B-1

Polyoxyethylenesorbitanmonolaurate (content of oxyethylene group: 72 wt %, trade name: SOLGEN TW-20, manufactured by DAI-ICHI KOGYO SEIYAKU CO., LTD.)

Plasticizer B-2

Polyoxyethylene sorbitan monomyristate (content of oxyethylene group: 70 wt %.)

Plasticizer B-3

Polyoxyethylene sorbitan monostearate (content of oxyethylene group: 67 wt %, trade name: SOLGEN TW-60, manufactured by DAI-ICHI KOGYO SEIYAKU CO., LTD.)

Plasticizer B-4

Polyoxyethylene sorbitan monostearate (content of oxyethylene group: 82 wt %.)

Plasticizer B-5

Polyoxyethylene sorbitan monooleate (content of oxyethylene group: 67 wt %, trade name: SOLGEN TW-80, manufactured by DAI-ICHI KOGYO SEIYAKU CO., LTD.)

Plasticizer B-6

Polyoxyethylene sorbitan monobehenate (content of oxyethylene group: 64 wt %.)

Plasticizer B-7

Polyoxyethylene sorbitan dilaurate (content of oxyethylene group: 45 wt %.)

Plasticizer B-8

Polyoxyethylene sorbitan distearate (content of oxyethylene group: 56 wt %.)

Plasticizer B-9

Polyoxyethylene sorbitan dibehenate (content of oxyethylene group: 52 wt %.)

Plasticizer B-10

Polyoxyethylene sorbitan trilaurate (content of oxyethylene group: 55 wt %.)

Plasticizer B-11

Polyoxyethylene sorbitan tristearate (content of oxyethylene group: 27 wt %.)

Plasticizer B-12

Polyoxyethylene sorbitan tristearate (content of oxyethylene group: 48 wt %, SOLGEN TW-65, manufactured by DAI-ICHI KOGYO SEIYAKU CO., LTD.)

Plasticizer B-13

Polyoxyethylene sorbitan trioleate (content of oxyethylene group: 48 wt %, TWEEN 85, manufactured by Croda.)

Plasticizer B-14

Polyoxyethylene sorbitan tribehenate (content of oxyethylene group: 44 wt %.)

Plasticizer B-15

Polyoxyethylene sorbitan tri-12-hydroxystearate (content of oxyethylene group: 47 wt %.)

Plasticizer B-16

Polyoxyethylene mannitan monostearate (content of oxyethylene group: 67%.)

Plasticizer B-17

Polyoxyethylene mannitan tristearate (content of oxyethylene group: 48 wt %.)

Plasticizer B-18

Polyoxyethylene sorbitol tetraoleate (content of oxyethylene group: 52 wt %, trade name: RHEODOL 430V, manufactured by Kao Corporation.)

Plasticizer B-19

Polyoxyethylene sorbitol tetraoleate (content of oxyethylene group: 68 wt %, trade name: RHEODOL 460V, manufactured by Kao Corporation.)

Plasticizer B-20

Polyoxyethylene isosorbide distearate (content of oxyethylene group: 56 wt %.)

Plasticizer B-21

Polyoxyethylene isomannide distearate (content of oxyethylene group: 56 wt %.)

Plasticizer b-1

Diester compound formed of adipic acid and a mixture of benzyl alcohol/diethylene glycol monomethyl ether=1/1 (content of oxyethylene group: 26 wt %, trade name: DAI-FATTY-101, manufactured by DAIHACHI CHEMICAL INDUSTRY CO., LTD.)

Plasticizer b-2

Glycerin monostearate (content of oxyethylene group: 0 wt %, trade name: EXCEL S-95, manufactured by Kao Corporation.)

Plasticizer b-3

Diester formed of succinic acid and triethylene glycol monomethyl ether (content of oxyethylene group: 43 wt %.)

Plasticizer b-4

Polyoxyethylene glycerin tricaprylate (content of oxyethylene group: 53 wt %.)

Plasticizer b-5

Fatty acid ester of polyglycerin (content of oxyethylene group: 0 wt %, trade name: CHIRABAZOL VR-05, manufactured by Taiyo Kagaku Co., Ltd.)

Plasticizer b-6

Glycerin diacetomonocaprate (content of oxyethylene group: 0 wt %, trade name: RIKEMAL PL-019, manufactured by Riken Vitamin Co., Ltd.)

Crystal Nucleating Agent C-1
Zinc phenylphosphonate (trade name: ECOPROMOTE, manufactured by NISSAN CHEMICAL INDUSTRIES, LTD.)
Crystal Nucleating Agent C-2
Trimesic acid tricyclohexylamide (trade name: NJSTAR TF-1, manufactured by New Japan Chemical Co., Ltd.)
Crystal Nucleating Agent C-3
Octamethylenedicarboxylic acid dibenzoylhydrazide (trade name: T-1287N, manufactured by ADEKA CORPORATION)
Crystal Nucleating Agent C-4
Dimethyl 5-sulfoisophthalate potassium salt (trade name: LAK-301, manufactured by TAKEMOTO OIL & FAT Co., Ltd.)
Crystal Nucleating Agent C-5
Copper phthalocyanine (trade name: Heliogen Blue K7090, manufactured by BASF.)
Crystal Nucleating Agent C-6
Melamine cyanurate (trade name: MC-600, manufactured by NISSAN CHEMICAL INDUSTRIES, LTD.)
Crystal Nucleating Agent c-1
Talc (trade name: MICRO ACE P-6, manufactured by Nippon Talc Co., Ltd.)
Crystal Nucleating Agent c-2
Mica (trade name: CS-325DC, manufactured by YAMAGUCHI MICA CO., LTD.)
Crystal Nucleating Agent c-3
Stearic acid amide (manufactured by TOKYO CHEMICAL INDUSTRY CO., LTD.)
Crystal Nucleating Agent c-4
Montmorillonite, in which an ion between layers is substituted by a dioctadecyldimethylammonium ion (trade name: S-BEN W, manufactured by HOJUN CO., LTD.)
PMMA (D-1)
Polymethylmethacrylate (trade name: ACRYPET HV, manufactured by MITSUBISHI RAYON CO., LTD.)
Silica (E-1)
Silica modified with a poly-D-lactic acid obtained by Synthesis Example 2 below.

Synthesis Example 2

10.0 Grams of tetraethoxysilane were dissolved in 990 g of D-lactic acid (manufactured by Purac, 90-mass % aqueous solution), and then subjected to dehydration condensation at 130° C. for 4 hours while the resultant mixture was subjected to nitrogen bubbling. Further, dehydration polymerization was performed by stirring the mixture at 170° C. under a reduced pressure of 5 mmHg for 12 hours. A fluid polymer obtained by the reaction was taken out and cooled to be solidified. Thus, about 680 g of silica modified with a colorless, transparent poly-D-lactic acid of interest (silica content: 0.42%) were obtained.
Silica (E-2)
Aerosil (trade name: REOLOSIL QS-102, manufactured by Tokuyama Corporation, content of silica: >99.9%.)
Antioxidant (F-1)
Hindered phenolic antioxidant (trade name: IRGANOX 1076, manufactured by BASF.)
Hydrolysis Inhibitor (G-1)
Poly(4,4'-dicyclohexylmethanecarbodiimide) (trade name: CARBODILITE LA-1, manufactured by Nisshinbo)

Examples 1 to 54 and Comparative Examples 1 to 11

The respective materials were blended at ratios shown in Table 1 to Table 7 below, and then the mixtures were heated and kneaded with a twin-screw extruder (KZW20-30MG manufactured by TECHNOVEL CORPORATION) under the condition of a temperature of its cylinder of 160 to 190° C. Thus, pellets of resin compositions were obtained. It should be noted that the pellets were dried under reduced pressure at a temperature of 70° C. for 12 hours or more.

The polylactic acid resin compositions (pellets) of the examples and the comparative examples thus obtained were measured and evaluated for their respective characteristics in accordance with the following criteria. Table 1 to Table 7 below show the results together.

Mold Holding Time

A sheet having a thickness of 0.4 mm was produced from each of the pellets with a T-die extruder (manufactured by TECHNOVEL CORPORATION). After that, the sheet was heated from above and below with an infrared heater at about 300° C. to be softened. Subsequently, the sheet was loaded into a mold with its temperature controlled to 90° C., and was then subjected to vacuum pressure molding, followed by removal from the mold. Thus, a resin molded article was obtained. During the removal from the mold, the time required for the resin molded article to be taken out of the mold without any deformation (mold holding time) was measured. It should be noted that productivity becomes higher as the mold holding time shortens.

Heat Resistance

The resin molded article (molded article formed of the polylactic acid resin composition) obtained by such mold forming as described above was loaded into an oven at 90° C. and held for 30 minutes. Then, the molded article was evaluated as "◦" when no deformation was observed after the heating, or was evaluated as "x" when the molded article deformed after the heating.

Impact Resistance

A falling ball impact test was performed by placing an impact shaft having a spherical end having a diameter of 10 mm on the resin molded article obtained by such mold forming as described above, and then allowing a weight of 300 g or 500 g to fall onto the impact shaft. In addition, the falling height (mm) of the weight when a crack occurred in the resin molded article was measured. It should be noted that a case where no crack occurred in the resin molded article even when the falling height was more than 1,000 mm was denoted with ">1,000," and a case where a crack occurred in the resin molded article even when the falling height was less than 50 mm was denoted with "<50."

Migration Resistance

The polylactic acid resin composition (pellet) was melted with a twin roll heated to 200° C., and then pressed with a press molding machine heated to 200° C. for about 3 minutes to produce a pressed sheet having a thickness of 1 mm. The resultant sheet was cut so as to have a surface area of 130 cm$^2$, and then immersed in 200 ml of a 10% ethanol solution (food simulant), followed by heating at 66° C. for 2 hours. Then, the solution after the sheet had been taken out was evaporated to dryness, and the weight of the residue was measured to determine the migration amount per unit area (μg/cm$^2$) of the sheet. It should be noted that a smaller value for the migration amount means that the resin molded article is more excellent in migration resistance.

TABLE 1

| | | | | | | | | | | Part(s) by weight |
|---|---|---|---|---|---|---|---|---|---|---|
| | | Example | | | | | | | | |
| | | 1 | 2 | 3 | 4 | 5 | 6 | 7 | 8 | 9 | 10 |
| Polylactic acid | A-1 | 100 | 100 | 100 | 100 | 100 | 100 | 100 | 100 | 100 | 100 |
| Plasticizer | B-1 | 5 | — | — | — | — | — | — | — | — | — |
| | B-2 | — | 5 | — | — | — | — | — | — | — | — |
| | B-3 | — | — | 5 | — | — | — | — | — | — | — |
| | B-4 | — | — | — | 5 | — | — | — | — | — | — |
| | B-5 | — | — | — | — | 5 | — | — | — | — | — |
| | B-6 | — | — | — | — | — | 5 | — | — | — | — |
| | B-7 | — | — | — | — | — | — | 5 | — | — | — |
| | B-8 | — | — | — | — | — | — | — | 5 | — | — |
| | B-9 | — | — | — | — | — | — | — | — | 5 | — |
| | B-10 | — | — | — | — | — | — | — | — | — | 5 |
| Crystal nucleating agent | C-1 | 1 | 1 | 1 | 1 | 1 | 1 | 1 | 1 | 1 | 1 |
| | C-2 | — | — | — | — | — | — | — | — | — | — |
| | C-3 | — | — | — | — | — | — | — | — | — | — |
| | C-4 | — | — | — | — | — | — | — | — | — | — |
| | C-5 | — | — | — | — | — | — | — | — | — | — |
| | C-6 | — | — | — | — | — | — | — | — | — | — |
| PMMA | D-1 | — | — | — | — | — | — | — | — | — | — |
| Silica | E-1 | — | — | — | — | — | — | — | — | — | — |
| | E-2 | — | — | — | — | — | — | — | — | — | — |
| Antioxidant | F-1 | — | — | — | — | — | — | — | — | — | — |
| Hydrolysis inhibitor G-1 | | — | — | — | — | — | — | — | — | — | — |
| Mold holding time (s) | | 5 | 5 | 5 | 5 | 5 | 5 | 5 | 5 | 5 | 5 |
| Heat resistance | | ○ | ○ | ○ | ○ | ○ | ○ | ○ | ○ | ○ | ○ |
| Impact resistance (mm) | Weight 300 g | >1,000 | >1,000 | >1,000 | >1,000 | >1,000 | >1,000 | >1,000 | >1,000 | >1,000 | >1,000 |
| | Weight 500 g | 500 | 500 | 500 | 400 | 550 | 600 | >1,000 | >1,000 | >1,000 | >1,000 |
| Migration amount (μg/cm$^2$) | | 5.8 | 5.2 | 5.5 | 3.8 | 5.3 | 5.3 | 8.3 | 5.2 | 5.1 | 5.2 |

TABLE 2

| | | | | | | | | | | Part(s) by weight |
|---|---|---|---|---|---|---|---|---|---|---|
| | | Example | | | | | | | | |
| | | 11 | 12 | 13 | 14 | 15 | 16 | 17 | 18 | 19 | 20 |
| Polylactic acid | A-1 | 100 | 100 | 100 | 100 | 100 | 100 | 100 | 100 | 100 | 100 |
| Plasticizer | B-11 | 5 | — | — | — | — | — | — | — | — | — |
| | B-12 | — | 5 | — | — | — | — | — | — | — | — |
| | B-13 | — | — | 5 | — | — | — | — | — | — | — |
| | B-14 | — | — | — | 5 | — | — | — | — | — | — |
| | B-15 | — | — | — | — | 5 | — | — | — | — | — |
| | B-16 | — | — | — | — | — | 5 | — | — | — | — |
| | B-17 | — | — | — | — | — | — | 5 | — | — | — |
| | B-18 | — | — | — | — | — | — | — | 5 | — | — |
| | B-19 | — | — | — | — | — | — | — | — | 5 | — |
| | B-20 | — | — | — | — | — | — | — | — | — | 5 |
| Crystal nucleating agent | C-1 | 1 | 1 | 1 | 1 | 1 | 1 | 1 | 1 | 1 | 1 |
| | C-2 | — | — | — | — | — | — | — | — | — | — |
| | C-3 | — | — | — | — | — | — | — | — | — | — |
| | C-4 | — | — | — | — | — | — | — | — | — | — |
| | C-5 | — | — | — | — | — | — | — | — | — | — |
| | C-6 | — | — | — | — | — | — | — | — | — | — |
| PMMA | D-1 | — | — | — | — | — | — | — | — | — | — |
| Silica | E-1 | — | — | — | — | — | — | — | — | — | — |
| | E-2 | — | — | — | — | — | — | — | — | — | — |
| Antioxidant | F-1 | — | — | — | — | — | — | — | — | — | — |
| Hydrolysis inhibitor G-1 | | — | — | — | — | — | — | — | — | — | — |
| Mold holding time (s) | | 5 | 5 | 5 | 5 | 5 | 5 | 5 | 5 | 5 | 5 |
| Heat resistance | | ○ | ○ | ○ | ○ | ○ | ○ | ○ | ○ | ○ | ○ |
| Impact resistance (mm) | Weight 300 g | >1,000 | >1,000 | >1,000 | >1,000 | >1,000 | >1,000 | >1,000 | >1,000 | >1,000 | >1,000 |
| | Weight 500 g | >1,000 | >1,000 | >1,000 | >1,000 | >1,000 | 500 | >1,000 | >1,000 | 700 | >1,000 |
| Migration amount (μg/cm$^2$) | | 5.3 | 4.8 | 4.8 | 4.2 | 4.8 | 5.5 | 4.8 | 3.8 | 3.2 | 5.3 |

TABLE 3

|  |  | Example | | | | | | | | | | Part(s) by weight |
|---|---|---|---|---|---|---|---|---|---|---|---|---|
|  |  | 21 | 22 | 23 | 24 | 25 | 26 | 27 | 28 | 29 | 30 | |
| Polylactic acid | A-1 | 100 | 100 | 100 | 100 | 100 | 100 | 100 | 100 | 100 | 100 | |
| Plasticizer | B-3 | — | 5 | 5 | 5 | 5 | 5 | — | — | — | — | |
|  | B-12 | — | — | — | — | — | — | 5 | 5 | 5 | 5 | |
|  | B-21 | 5 | — | — | — | — | — | — | — | — | — | |
| Crystal | C-1 | 1 | — | — | — | — | — | — | — | — | — | |
| nucleating | C-2 | — | 1 | — | — | — | — | 1 | — | — | — | |
| agent | C-3 | — | — | 1 | — | — | — | — | 1 | — | — | |
|  | C-4 | — | — | — | 1 | — | — | — | — | 1 | — | |
|  | C-5 | — | — | — | — | 1 | — | — | — | — | 1 | |
|  | C-6 | — | — | — | — | — | 1 | — | — | — | — | |
| PMMA | D-1 | — | — | — | — | — | — | — | — | — | — | |
| Silica | E-1 | — | — | — | — | — | — | — | — | — | — | |
|  | E-2 | — | — | — | — | — | — | — | — | — | — | |
| Antioxidant | F-1 | — | — | — | — | — | — | — | — | — | — | |
| Hydrolysis inhibitor G-1 |  | — | — | — | — | — | — | — | — | — | — | |
| Mold holding time (s) |  | 5 | 5 | 5 | 5 | 5 | 5 | 5 | 5 | 5 | 5 | |
| Heat resistance |  | ○ | ○ | ○ | ○ | ○ | ○ | ○ | ○ | ○ | ○ | |
| Impact | Weight 300 g | >1,000 | >1,000 | >1,000 | >1,000 | >1,000 | >1,000 | >1,000 | >1,000 | >1,000 | >1,000 | |
| resistance (mm) | Weight 500 g | >1,000 | 500 | 500 | 500 | 500 | 500 | >1,000 | >1,000 | >1,000 | >1,000 | |
| Migration amount ($\mu g/cm^2$) |  | 5.2 | 5.5 | 5.4 | 5.5 | 5.4 | 5.4 | 4.8 | 4.8 | 4.8 | 4.8 | |

TABLE 4

|  |  | Example | | | | | | | | | | Part(s) by weight |
|---|---|---|---|---|---|---|---|---|---|---|---|---|
|  |  | 31 | 32 | 33 | 34 | 35 | 36 | 37 | 38 | 39 | 40 | |
| Polylactic acid | A-1 | 100 | 100 | 100 | 100 | 100 | 100 | 100 | 100 | 100 | 100 | |
| Plasticizer | B-3 | — | 2 | 10 | 15 | — | — | — | 5 | 5 | 5 | |
|  | B-12 | 5 | — | — | — | 2 | 10 | 15 | — | — | — | |
| Crystal | C-1 | — | 1 | 1 | 1 | 1 | 1 | 1 | 0.1 | 5 | 1 | |
| nucleating | C-2 | — | — | — | — | — | — | — | — | — | — | |
| agent | C-3 | — | — | — | — | — | — | — | — | — | — | |
|  | C-4 | — | — | — | — | — | — | — | — | — | — | |
|  | C-5 | — | — | — | — | — | — | — | — | — | — | |
|  | C-6 | 1 | — | — | — | — | — | — | — | — | — | |
| PMMA | D-1 | — | — | — | — | — | — | — | — | — | 2 | |
| Silica | E-1 | — | — | — | — | — | — | — | — | — | — | |
|  | E-2 | — | — | — | — | — | — | — | — | — | — | |
| Antioxidant | F-1 | — | — | — | — | — | — | — | — | — | — | |
| Hydrolysis inhibitor G-1 |  | — | — | — | — | — | — | — | — | — | — | |
| Mold holding time (s) |  | 5 | 5 | 5 | 5 | 5 | 5 | 5 | 5 | 5 | 5 | |
| Heat resistance |  | ○ | ○ | ○ | ○ | ○ | ○ | ○ | ○ | ○ | ○ | |
| Impact | Weight 300 g | >1,000 | 700 | >1,000 | >1,000 | 800 | >1,000 | >1,000 | >1,000 | >1,000 | >1,000 | |
| resistance (mm) | Weight 500 g | >1,000 | 350 | >1,000 | >1,000 | 400 | >1,000 | >1,000 | >1,000 | >1,000 | >1,000 | |
| Migration amount ($\mu g/cm^2$) |  | 4.7 | 2.1 | 8.4 | 14.2 | 1.6 | 7.9 | 12.6 | 5.2 | 5.4 | 5.3 | |

TABLE 5

|  |  | Example | | | | | | | | | | Part(s) by weight |
|---|---|---|---|---|---|---|---|---|---|---|---|---|
|  |  | 41 | 42 | 43 | 44 | 45 | 46 | 47 | 48 | 49 | 50 | |
| Polylactic acid | A-1 | 100 | 100 | 100 | 100 | — | 100 | 100 | 100 | 100 | 100 | |
|  | A-2 | — | — | — | — | 100 | — | — | — | — | — | |
|  | A-3 | — | — | — | — | — | — | — | — | — | — | |
| Plasticizer | B-3 | 5 | 5 | 5 | 5 | 5 | — | — | — | — | — | |
|  | B-12 | — | — | — | — | — | 5 | 5 | 5 | 5 | 5 | |
| Crystal | C-1 | 1 | 1 | 1 | 1 | 1 | 0.1 | 5 | 1 | 1 | 1 | |
| nucleating | C-2 | — | — | — | — | — | — | — | — | — | — | |
| agent | C-3 | — | — | — | — | — | — | — | — | — | — | |
|  | C-4 | — | — | — | — | — | — | — | — | — | — | |
|  | C-5 | — | — | — | — | — | — | — | — | — | — | |
|  | C-6 | — | — | — | — | — | — | — | — | — | — | |

TABLE 5-continued

| | | Example | | | | | | | | | | Part(s) by weight |
|---|---|---|---|---|---|---|---|---|---|---|---|---|
| | | 41 | 42 | 43 | 44 | 45 | 46 | 47 | 48 | 49 | 50 | |
| PMMA | D-1 | 5 | 10 | 3 | 3 | 3 | — | — | 2 | 5 | 10 | |
| Silica | E-1 | — | — | 10 | — | — | — | — | — | — | — | |
| | E-2 | — | — | — | 0.1 | — | — | — | — | — | — | |
| Antioxidant | F-1 | — | — | — | 0.3 | 0.3 | — | — | — | — | — | |
| Hydrolysis inhibitor G-1 | | — | — | — | 1 | 1 | — | — | — | — | — | |
| Mold holding time (s) | | 5 | 5 | 5 | 5 | 5 | 5 | 5 | 5 | 5 | 5 | |
| Heat resistance | | ○ | ○ | ○ | ○ | ○ | ○ | ○ | ○ | ○ | ○ | |
| Impact resistance (mm) | Weight 300 g | >1,000 | >1,000 | >1,000 | >1,000 | >1,000 | >1,000 | >1,000 | >1,000 | >1,000 | >1,000 | |
| | Weight 500 g | >1,000 | >1,000 | >1,000 | >1,000 | >1,000 | >1,000 | >1,000 | >1,000 | >1,000 | >1,000 | |
| Migration amount (μg/cm$^2$) | | 5.3 | 5.3 | 6.4 | 5.3 | 5.3 | 4.7 | 4.7 | 4.6 | 4.6 | 4.6 | |

TABLE 6

| | | Example | | | | Part(s) by weight |
|---|---|---|---|---|---|---|
| | | 51 | 52 | 53 | 54 | |
| Polylactic acid | A-1 | 100 | 100 | — | 50 | |
| | A-2 | — | — | 100 | — | |
| | A-3 | — | — | — | 50 | |
| Plasticizer | B-12 | 5 | 5 | 5 | 5 | |
| Crystal nucleating agent | C-1 | 1 | 1 | 1 | 1 | |
| | C-2 | — | — | — | — | |
| | C-3 | — | — | — | — | |
| | C-4 | — | — | — | — | |
| | C-5 | — | — | — | — | |
| | C-6 | — | — | — | — | |
| PMMA | D-1 | 3 | 3 | 3 | 3 | |
| Silica | E-1 | 10 | — | — | — | |
| | E-2 | — | 0.1 | — | — | |
| Antioxidant | F-1 | — | 0.3 | 0.3 | 0.3 | |
| Hydrolysis inhibitor G-1 | | — | 1 | 1 | 1 | |
| Mold holding time (s) | | 5 | 5 | 5 | 5 | |
| Heat resistance | | ○ | ○ | ○ | ○ | |
| Impact resistance (mm) | Weight 300 g | >1,000 | >1,000 | >1,000 | >1,000 | |
| | Weight 500 g | >1,000 | >1,000 | >1,000 | >1,000 | |
| Migration amount (μg/cm$^2$) | | 5.3 | 4.6 | 4.6 | 4.3 | |

TABLE 7

| | | Comparative Example | | | | | | | | | | | Part(s) by weight |
|---|---|---|---|---|---|---|---|---|---|---|---|---|---|
| | | 1 | 2 | 3 | 4 | 5 | 6 | 7 | 8 | 9 | 10 | 11 | |
| Polylactic acid A-1 | | 100 | 100 | 100 | 100 | 100 | 100 | 100 | 100 | 100 | 100 | 100 | |
| Plasticizer | B-1 | — | — | — | — | — | — | — | 5 | 5 | 5 | 5 | |
| | b-1 | — | 5 | — | — | — | — | — | — | — | — | — | |
| | b-2 | — | — | 5 | — | — | — | — | — | — | — | — | |
| | b-3 | — | — | — | 5 | — | — | — | — | — | — | — | |
| | b-4 | — | — | — | — | 5 | — | — | — | — | — | — | |
| | b-5 | — | — | — | — | — | 5 | — | — | — | — | — | |
| | b-6 | — | — | — | — | — | — | 5 | — | — | — | — | |
| Crystal nucleating agent | C-1 | — | 1 | 1 | 1 | 1 | 1 | 1 | — | — | — | — | |
| | c-1 | — | — | — | — | — | — | — | 1 | — | — | — | |
| | c-2 | — | — | — | — | — | — | — | — | 1 | — | — | |
| | c-3 | — | — | — | — | — | — | — | — | — | 1 | — | |
| | c-4 | — | — | — | — | — | — | — | — | — | — | 1 | |
| PMMA | D-1 | — | — | — | — | — | — | — | — | — | — | — | |
| Silica | E-1 | — | — | — | — | — | — | — | — | — | — | — | |
| | E-2 | — | — | — | — | — | — | — | — | — | — | — | |
| Antioxidant | F-1 | — | — | — | — | — | — | — | — | — | — | — | |
| Hydrolysis inhibitor G-1 | | — | — | — | — | — | — | — | — | — | — | — | |
| Mold holding time (s) | | 600 | 20 | 15 | 18 | 19 | 21 | 18 | 37 | 48 | 53 | 55 | |
| Heat resistance | | ○ | ○ | ○ | ○ | ○ | ○ | ○ | x | x | x | x | |
| Impact resistance (mm) | Weight 300 g | 250 | 250 | 250 | 250 | 250 | >1,000 | 250 | 700 | 700 | 900 | 700 | |
| | Weight 500 g | <50 | <50 | <50 | <50 | <50 | 450 | <50 | 150 | 150 | 150 | 150 | |
| Migration amount (μg/cm$^2$) | | 0.8 | 51.5 | 91.2 | 96.2 | 30.2 | 5.9 | 98.0 | 5.8 | 5.8 | 5.8 | 5.8 | |

As can be seen from the results of the tables, the polylactic acid resin compositions of the examples each had high productivity because their mold holding times were shorter than those of the polylactic acid resin compositions of the comparative examples. Further, the polylactic acid resin compositions of the examples were each excellent in heat resistance because none of the resin molded articles thereof showed deformation due to heating. In addition, the polylactic acid resin compositions of the examples were each excellent in impact resistance as compared to the polylactic acid resin compositions of the comparative examples.

The polylactic acid resin composition of the embodiments herein and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the embodiments herein can be suitably utilized in wider fields than a conventional polylactic acid resin composition is because its impact resistance, heat resistance, and the like have been improved as compared to those of the conventional polylactic acid resin composition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A polylactic acid resin composition consisting of:
(i) a polylactic acid;
(ii) a reaction product of:
   a polyol selected from the group consisting of sorbitol, mannitol, and dehydration condensates thereof, and combinations thereof,
   an alkylene oxide consisting of (a) ethylene oxide and (b) a compound selected from the group consisting of propylene oxide, butylene oxide, isobutylene oxide, and combinations thereof, wherein said ethylene oxide accounts for over half of the weight of all of the alkylene oxide, and
   a fatty acid having 12 to 24 carbon atoms;
(iii) a crystal nucleating agent selected from the group consisting of zinc phenylphosphonate, N,N',N"-tricyclohexyl trimesic acid amide, octamethylenedicarboxylic acid dibenzoylhydrazide, decamethylenedicarboxylic acid dibenzoylhydrazide, barium dimethyl 5-sulfoisophthalate, potassium dimethyl 5-sulfoisophthalate, and combinations thereof, and
(iv) optionally, one or more components selected from the group consisting of:
   (1) another resin selected from the group consisting of a polymethyl methacrylate resin, a polypropylene resin, a polystyrene resin, an acrylonitrile butadiene styrene resin, an acrylonitrile styrene resin, a polyphenylene sulfide resin, a polyetheretherketone resin, a polyacetal resin, a polysulfone resin, a polyphenylene oxide resin, a polyetherimide resin, a phenol resin, a melamine resin, an unsaturated polyester resin, a silicone resin, an epoxy resin, and combinations thereof,
   (2) an inorganic filler selected from the group consisting of silica, silica modified with a poly-D-lactic acid, zeolite, a glass fiber, and a carbon fiber,
   (3) a hydrolysis inhibitor selected from the group consisting of polycarbodiimide compound, a monocarbodiimide compound, and combinations thereof,
   (4) an impact modifier selected from the group consisting of a (meth)acrylic acid polymer, an ethylene-(meth)acrylic acid copolymer, an ethylene-alkyl (meth)acrylate copolymer, an epoxy-modified silicone acrylic rubber, a copolymer of a diene and a vinyl monomer, a hydrogenated product of the copolymer of the diene and the vinyl monomer, organic fibers, a diene rubber, and combinations thereof,
   (5) an antioxidant,
   (6) an anti-fogging agent,
   (7) a light stabilizer,
   (8) a UV absorber,
   (9) a pigment,
   (10) a colorant,
   (11) an antifungal agent,
   (12) an antibacterial agent, and
   (13) a foaming agent,
wherein the reaction product (ii) has 20 to 95 wt % of an oxyethylene group,
wherein a content of the reaction product (ii) falls within a range of 0.5 to 20 parts by weight with respect to 100 parts by weight of the polylactic acid (i), and
wherein a content of the crystal nucleating agent (iii) falls within a range of 0.1 to 5 parts by weight with respect to 100 parts by weight of the polylactic acid (i).

2. The polylactic acid resin composition according to claim 1, wherein the reaction product (ii) has 27 to 82 wt % of an oxyethylene group.

3. A resin molded article consisting of a polylactic acid resin composition consisting of:
(i) a polylactic acid;
(ii) a reaction product of:
   a polyol selected from the group consisting of sorbitol, mannitol, and dehydration condensates thereof, and combinations thereof,
   an alkylene oxide consisting of (a) ethylene oxide and (b) a compound selected from the group consisting of propylene oxide, butylene oxide, isobutylene oxide, and combinations thereof, wherein said ethylene oxide accounts for over half of the weight of all of the alkylene oxide, and
   a fatty acid having 12 to 24 carbon atoms;
(iii) a crystal nucleating agent selected from the group consisting of octamethylenedicarboxylic acid dibenzohydrazide, zinc phenylphosphonate, a dimethyl 5-sulfoisophthalate potassium salt, and combinations thereof, and (iv) optionally, one or more components selected from the group consisting of:
  (1) another resin selected from the group consisting of a polymethyl methacrylate resin, a polypropylene resin, a polystyrene resin, an acrylonitrile butadiene styrene resin, an acrylonitrile styrene resin, a polyphenylene sulfide resin, a polyetheretherketone resin, a polyacetal resin, a polysulfone resin, a polyphenylene oxide resin, a polyetherimide resin, a phenol resin, a melamine resin, an unsaturated polyester resin, a silicone resin, an epoxy resin, and combinations thereof,
  (2) an inorganic filler selected from the group consisting of silica, silica modified with a poly-D-lactic acid, zeolite, a glass fiber, and a carbon fiber,
  (3) a hydrolysis inhibitor selected from the group consisting of polycarbodiimide compound, a monocarbodiimide compound, and combinations thereof,
  (4) an impact modifier selected from the group consisting of a (meth)acrylic acid polymer, an ethylene-(meth)acrylic acid copolymer, an ethylene-alkyl (meth)acrylate copolymer, an epoxy-modified silicone acrylic rubber, a copolymer of a diene and a vinyl monomer, a hydrogenated product of the copolymer of the diene and the vinyl monomer, organic fibers, a diene rubber, and combinations thereof,
  (5) an antioxidant,
  (6) an anti-fogging agent,
  (7) a light stabilizer,
  (8) a UV absorber,
  (9) a pigment,
  (10) a colorant,
  (11) an antifungal agent,
  (12) an antibacterial agent, and
  (13) a foaming agent,
wherein the reaction product (ii) has 20 to 95 wt % of an oxyethylene group,
wherein a content of the reaction product (ii) falls within a range of 0.5 to 20 parts by weight with respect to 100 parts by weight of the polylactic acid (i), and
wherein a content of the crystal nucleating agent (iii) falls within a range of 0.1 to 5 parts by weight with respect to 100 parts by weight of the polylactic acid (i).

4. The resin molded article according to claim 3, wherein the reaction product (ii) has 27 to 82 wt % of an oxyethylene group.

5. The polylactic acid resin composition according to claim 1, wherein the crystal nucleating agent (iii) is zinc phenylphosphonate.

6. The polylactic acid resin composition according to claim 1, wherein the crystal nucleating agent (iii) is a N,N',N"-tricyclohexyl trimesic acid amide.

7. The polylactic acid resin composition according to claim 1, wherein the crystal nucleating agent (iii) is octamethylenedicarboxylic acid dibenzoylhydrazide.

8. The polylactic acid resin composition according to claim 1, wherein the crystal nucleating agent (iii) is decamethylenedicarboxylic acid dibenzoylhydrazide.

9. The polylactic acid resin composition according to claim 1, wherein the crystal nucleating agent (iii) is barium dimethyl 5-sulfoisophthalate.

10. The polylactic acid resin composition according to claim 1, wherein the crystal nucleating agent (iii) is potassium dimethyl 5-sulfoisophthalate.

11. The resin molded article according to claim 3, wherein the crystal nucleating agent (iii) is zinc phenylphosphonate.

12. The resin molded article according to claim 3, wherein the crystal nucleating agent (iii) is a N,N',N"-tricyclohexyl trimesic acid amide.

13. The resin molded article according to claim 3, wherein the crystal nucleating agent (iii) is octamethylenedicarboxylic acid dibenzoylhydrazide.

14. The resin molded article according to claim 3, wherein the crystal nucleating agent (iii) is decamethylenedicarboxylic acid dibenzoylhydrazide.

15. The resin molded article according to claim 3, wherein the crystal nucleating agent (iii) is barium dimethyl 5-sulfoisophthalate.

16. The resin molded article according to claim 3, wherein the crystal nucleating agent (iii) is potassium dimethyl 5-sulfoisophthalate.

* * * * *